United States Patent

Huang

[11] Patent Number: 5,947,588
[45] Date of Patent: Sep. 7, 1999

[54] LIGHT FIXTURE WITH AN LED LIGHT BULB HAVING A CONVENTIONAL CONNECTION POST

[75] Inventor: Nan Huang Huang, Rancho Palos Verdes, Calif.

[73] Assignee: Grand General Accessories Manufacturing Inc., Compton, Calif.

[21] Appl. No.: 08/944,658

[22] Filed: Oct. 6, 1997

[51] Int. Cl.⁶ ..................................................... B60Q 1/02
[52] U.S. Cl. ........................ 362/235; 362/545; 362/549; 362/800
[58] Field of Search ................................. 362/234, 235, 362/236, 240, 543, 544, 545, 546, 548, 549, 800

[56] References Cited

U.S. PATENT DOCUMENTS

| | | | |
|---|---|---|---|
| 2,113,553 | 4/1938 | Dover | 362/549 |
| 5,036,248 | 7/1991 | McEwan et al. | 362/800 |
| 5,062,027 | 10/1991 | Machida et al. | 362/800 |
| 5,528,474 | 6/1996 | Roney et al. | 362/800 |

*Primary Examiner*—Y. Quach
*Attorney, Agent, or Firm*—Thomas I. Rozsa; Tony D. Chen; Jerry Fong

[57] ABSTRACT

A unique light-emitting diode (LED) light bulb which can be used in conjunction with a conventional light fixture which is mounted to a vehicle. The light fixture includes a hollow lens and a base plate attached to the lens. The base plate has a conventional socket housing with one or more contacts which is electrically coupled to a power source. The LED light bulb comprises an electrical circuit board, a plurality of light-emitting diodes mounted to the circuit board, and a connection post attached to the circuit board and adapted to be connected to the socket housing of the light fixture, where the plurality of light-emitting diodes are illuminated by the power source.

3 Claims, 2 Drawing Sheets

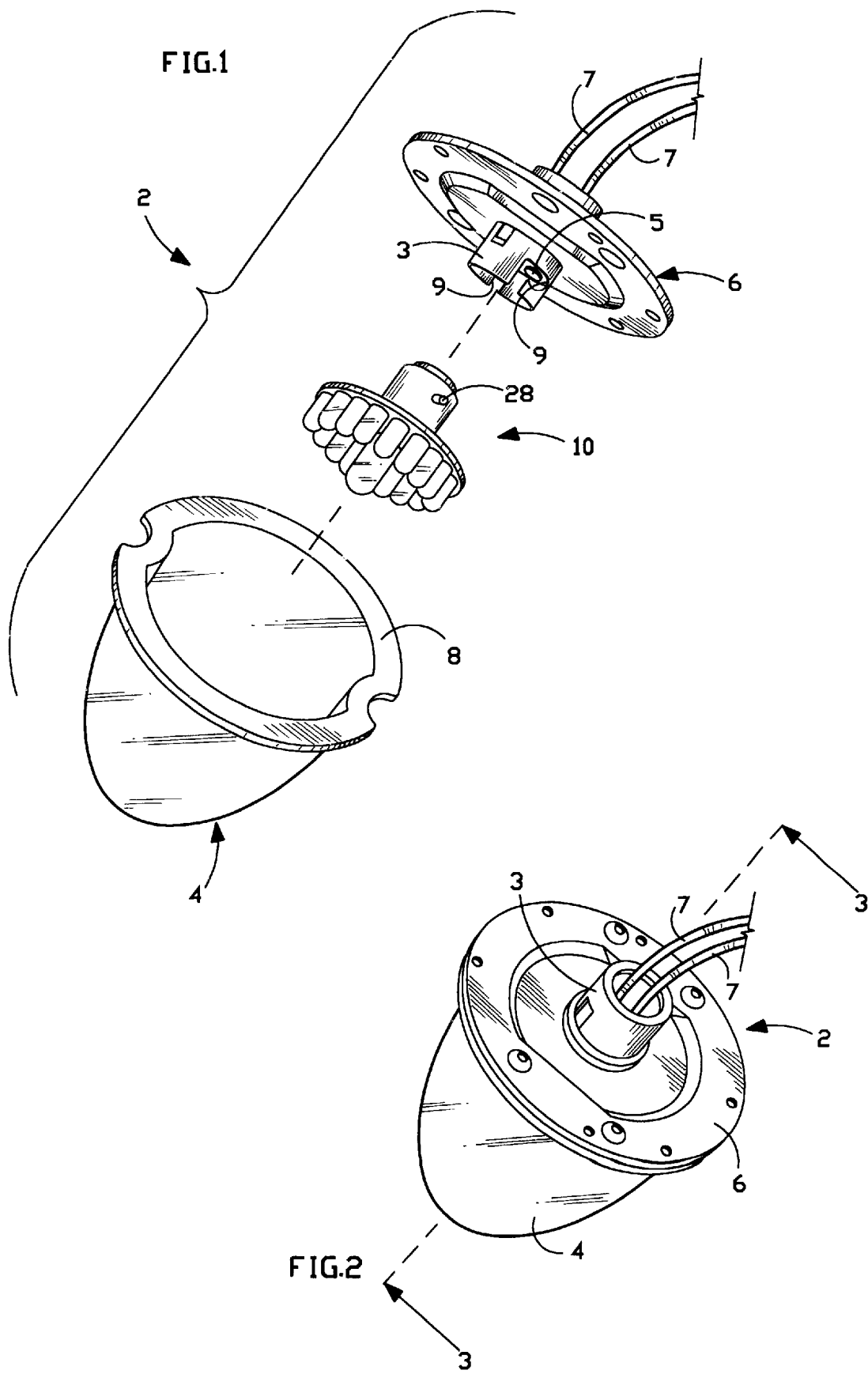

LIGHT FIXTURE WITH AN LED LIGHT BULB HAVING A CONVENTIONAL CONNECTION POST

BACKGROUND OF THE INVENTION

1. Field of the Invention

The present invention generally relates to the field of vehicle accessories. More particularly, the present invention relates to the field of light bulbs for light fixtures, e.g., turn signal lights, marker lights and etc., for vehicles.

2. Description of the Prior Art

In the prior art, most vehicle light fixtures are comprised of a hollow dome shaped lens, a base attached to a bottom of the dome lens, a connection socket housing attached to the base, and a conventional light bulb connected to the connection socket. The disadvantage with the prior art light bulb is that it is made only for one electric light bulb or incandescent lamp which is a tungsten filament enclosed within an evacuated glass bulb glows as electric current passes through it.

It is desirable to provide a light bulb that has a plurality of light-emitting diodes (LEDs) which can be illuminated all at once. It is also desirable to provide an LED light bulb which has a conventional connection post for connecting to a conventional socket housing of a light fixture, thereby providing a conventional connection therebetween.

SUMMARY OF THE INVENTION

The present invention is a unique light-emitting diode (LED) light bulb which can be used in conjunction with a conventional light fixture which is mounted to a vehicle. The light fixture includes a hollow lens and a base plate attached to the lens. The base plate has a conventional connection socket housing with one or more contacts which is electrically coupled to a power source.

The present invention LED light bulb comprises an electrical circuit board, a plurality of light-emitting diodes mounted to the circuit board, and a connection post attached to the circuit board and adapted to be connected to the connection socket housing of the light fixture, where the plurality of light-emitting diodes are illuminated by the power source.

It is therefore an object of the present invention to provide an LED light bulb with a conventional connection post which is adapted to a conventional connection socket housing provided by a conventional light fixture.

It is an additional object of the present invention to provide an LED light bulb with a plurality of light-emitting diodes which can be illuminated by a conventional light fixture through a power source.

It is a further object of the present invention to provide an LED light bulb with one or more contacts which match the contacts provided in a conventional connection socket housing.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an exploded perspective view of a conventional light fixture with the present invention LED light bulb;

FIG. 2 is a rear perspective view of the light fixture;

DESCRIPTION OF THE PREFERRED EMBODIMENT

Figure 3:
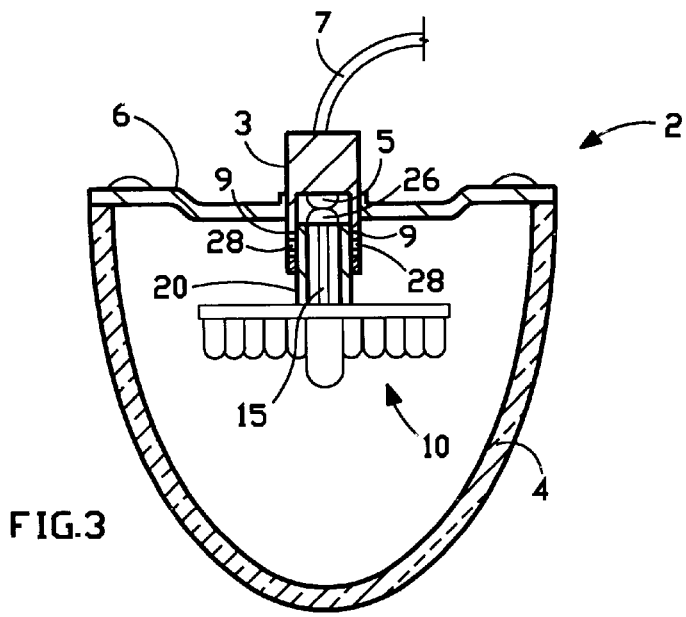
FIG. 3 is a cross-sectional view taken along line 3—3 of FIG. 2.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 and 2, there is shown a light fixture 2 adapted to be mounted to a vehicle (not shown). The light fixture 2 is conventional in the art and the description thereof will only be described in general terms. The light fixture 2 includes a generally hollow dome shaped lens 4, a circular base plate 6 mounted to a bottom edge 8 of the hollow lens 4 by conventional means, and the present invention light-emitting diode (LED) light bulb 10 enclosed within the hollow lens 4 by the base plate 6. The circular base plate 6 has a central aperture for receiving a conventional connection socket housing 3. The socket housing 3 is permanently fixed thereto by conventional means. One or more contacts 5 (only one is shown) are installed within the socket housing 3 and are adapted to be connected to a power source (not shown) by electrical wires 7. The socket housing 3 has two opposite lateral L-shaped retaining slits 9 thereto.

It will be appreciated that the hollow dome shaped lens 4 may be any shape, size or color.

Figure 4:
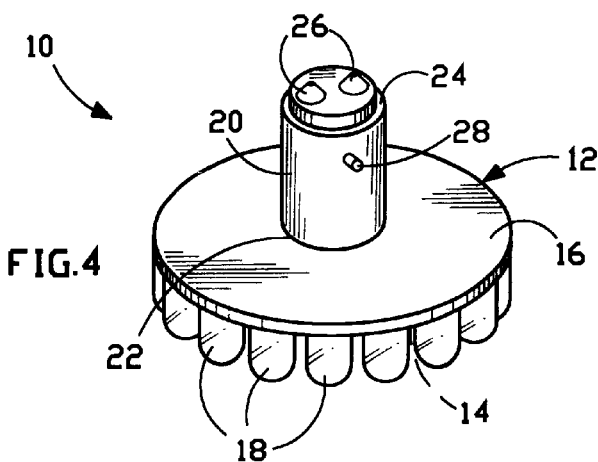
FIG. 4 is a rear perspective view of a preferred embodiment of the present invention LED light bulb with two electrical contacts.

Referring to FIGS. 3 and 4, the present invention LED light bulb 10 comprises an electrical circuit board 12, a plurality of light-emitting diodes 18, and a conventional connection post or means 20. The circuit board 12 is generally a circular shaped plate which has a top side 14 and a bottom side 16. The circuit board 12 is conventional constructed and prepared to receive electronic components, and the process for constructing and preparing the circuit board 12 thereof will not be described, since the process is well know to one skilled in the art.

The plurality of light-emitting diodes 18 are mounted on the top side 14 of the circuit board 12 and electrically coupled with the circuit board 12 by conventional means, where the plurality of light-emitting diodes 18 are arranged in a circular configuration. The plurality of light-emitting diodes 18 may be multiple of color LEDs. The connection post 20 has an open proximal end 22 and a closed distal end 24. The open proximal end 22 is attached to the bottom side 16 of the circuit board 12 by soldering means or any suitable means. The closed distal end 24 has two contacts 26 which are electrically coupled to the circuit board 12 by conventional means 15, for example electrical wires. The distal end 24 is adapted to be inserted into the connection socket housing 3 of the base plate 6 such that the two contacts 26 of the connection post 20 abut against the two contacts 5 of the connection socket housing 3 for providing electrical continuity therebetween (see FIG. 3), where the plurality of light-emitting diodes 18 are being illuminated by the power source.

The connection post 20 further includes two opposite side flanges 28 (only one is shown in FIG. 4) which are integrally attached to an exterior sidewall of the connection post 20, where the connection post 20 is rotatable such that the two opposite flanges 28 latch to the two opposite slits 9 provided on the connection socket housing 3 respectively.

One of the unique features of the present invention LED light bulb 10 is that it can replace a conventional light bulb used with the light fixture 2, without any modification to the light fixture 2 (see FIG. 1).

Figure 5:
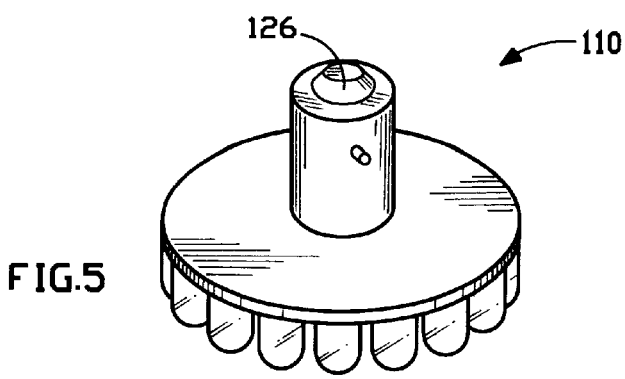
FIG. 5 is a rear perspective view of an alternative embodiment of the present invention LED light bulb with one electrical contact.

Referring to FIG. 5, there is shown an alternative embodiment of the present invention LED light bulb 110. In this embodiment, there is only one contact 126 instead of two contacts 26 as previously shown. Since, the alternative embodiment functions the same as previously described above, the description thereof will not be repeated.

Defined in detail, the present invention is a light fixture adapted to be mounted to a vehicle, comprising: (a) a lens; (b) a base plate mounted to the lens and having a conventional socket housing with at least one contact being adapted to connect to a power source; (c) an electrical circuit board having a top side and a bottom side; (d) a plurality of light-emitting diodes mounted on the top side of the circuit board and electrically coupled with the circuit board; and (e) a connection post having a distal end and a proximal end attached to the bottom side of the circuit board, the distal end having at least one contact electrically coupled to the circuit board, the distal end connected to the socket housing of the base plate such that the at least contact of the connection post abut against the at least one contact of the socket housing for providing continuity therebetween, where the plurality of light-emitting diodes are being illuminated by the power source.

Defined more broadly, the present invention is a light bulb used in conjunction with a light fixture which is mounted to a vehicle, the light fixture having a lens and a base mounted to the lens, the base having a conventional socket housing with at least one contact which is electrically coupled to a power source, the light bulb comprising: (a) an electrical circuit board having a top side and a bottom side; (b) a plurality of light-emitting diodes mounted on the top side of the circuit board and electrically coupled with the circuit board; and (c) a connection post having a proximal end attached to the bottom side of the circuit board, and a distal end having at least one contact electrically coupled to the circuit board and being adapted to connect to the socket housing of the light fixture such that the at least contact of the connection post being abutted against the at least one contact of the socket housing of the light fixture for providing continuity therebetween, where the plurality of light-emitting diodes are being illuminated by the power source.

Defined broadly, the present invention is a light bulb used in conjunction with a light fixture which is mounted to a vehicle, the light fixture having a lens and a base mounted to the lens, the base having a conventional socket with at least one contact which is electrically coupled to a power source, the light bulb comprising: (a) a circuit board; (b) at least two light-emitting diodes mounted on the circuit board and electrically coupled with the circuit board; and (c) means for connecting the circuit board to the socket and electrically coupling the circuit board to provide power to the at least two light-emitting diodes.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A light fixture adapted to be mounted to a vehicle, comprising:
   a. a lens;
   b. a base plate mounted to said lens and having a conventional socket housing with at least one contact being adapted to connect to a power source and two opposite slits;
   c. a light bulb including an electrical circuit board, a plurality of light-emitting diodes and a connection post;
   d. said electrical circuit board having a top side and a bottom side;
   e. said plurality of light-emitting diodes mounted on said top side of said circuit board and electrically coupled with said circuit board; and
   f. said connection post having a sidewall, a distal end and a proximal end, the sidewall having two opposite protruding flanges, the proximal end attached to said bottom side of said circuit board, the distal end having at least one contact electrically coupled to said circuit board, said connection post rotatably installed within said socket housing of said base plate such that the two opposite protruding flanges respectively latch to said two opposite slits to secure said light bulb thereto and the at least one contact of the connection post abut against the at least one contact of said socket housing for providing continuity therebetween, where the plurality of light-emitting diodes are being illuminated by the power source.

2. The light fixture in accordance with claim 1 wherein said lens is generally a hollow dome shaped body.

3. A light bulb used in conjunction with a light fixture which is mounted to a vehicle, the light fixture having a lens and a base mounted to the lens, the base having a conventional socket housing with two slits and at least one contact which is electrically coupled to a power source, the light bulb comprising:
   a. an electrical circuit board having a top side and a bottom side;
   b. a plurality of light-emitting diodes mounted on said top side of said circuit board and electrically coupled with said circuit board; and
   c. a connection post having a sidewall, a distal end and a proximal end, the sidewall having two flanges, the proximal end attached to said bottom side of said circuit board, the distal end having at least one contact electrically coupled to said circuit board the connection post being rotatable installed within the socket housing of the light fixture such that two flanges respectively latch to said two slits to secure said light bulb thereto and the at least one contact of the connection post being abutted against the at least one contact of the socket housing of the light fixture for providing continuity therebetween, where the plurality of light-emitting diodes are being illuminated by the power source.

* * * * *